(12) United States Patent
Leis et al.

(10) Patent No.: US 8,911,510 B2
(45) Date of Patent: Dec. 16, 2014

(54) ELECTRICAL DOUBLE LAYER CAPACITOR WITH ENHANCED WORKING VOLTAGE

(75) Inventors: Jaan Leis, Tartu (EE); Mati Arulepp, Tartu (EE); Anti Perkson, Nõo (EE)

(73) Assignee: Oü Skeleton Technologies Group, Tallinn (EE)

( * ) Notice: Subject to any disclaimer, the term of this patent is extended or adjusted under 35 U.S.C. 154(b) by 0 days.

(21) Appl. No.: 13/882,664

(22) PCT Filed: Oct. 31, 2011

(86) PCT No.: PCT/EP2011/069176
§ 371 (c)(1),
(2), (4) Date: Jul. 15, 2013

(87) PCT Pub. No.: WO2012/056050
PCT Pub. Date: May 3, 2012

(65) Prior Publication Data
US 2013/0283580 A1 Oct. 31, 2013

Related U.S. Application Data

(60) Provisional application No. 61/408,635, filed on Oct. 31, 2010.

(51) Int. Cl.
*H01G 9/00* (2006.01)
*H01G 11/52* (2013.01)
*H01G 11/84* (2013.01)
*H01G 11/14* (2013.01)
*H01G 11/58* (2013.01)

(52) U.S. Cl.
CPC ............ *H01G 11/14* (2013.01); *H01G 11/52* (2013.01); *Y02E 60/13* (2013.01); *H01G 11/84* (2013.01); *H01G 11/58* (2013.01)

USPC .................................................. 29/25.03

(58) Field of Classification Search
None
See application file for complete search history.

(56) References Cited

U.S. PATENT DOCUMENTS

| | | | |
|---|---|---|---|
| 6,512,667 B2 * | 1/2003 | Shiue et al. .................. 361/502 |
| 2011/0183180 A1 * | 7/2011 | Yu et al. ....................... 429/128 |
| 2012/0026643 A1 * | 2/2012 | Yu et al. ....................... 361/502 |

FOREIGN PATENT DOCUMENTS

| | | | |
|---|---|---|---|
| DE | 102008060546 B3 | 4/2010 |
| EP | 1860673 A1 | 11/2007 |

(Continued)

OTHER PUBLICATIONS

Leis et al., "Electrical double-layer characteristics of novel carbide-derived carbon materials", Carbon 44, (2006), pp. 2122-2129, Elsevier Ltd.

(Continued)

*Primary Examiner* — Seahvosh Nikmanesh
(74) *Attorney, Agent, or Firm* — Birch, Stewart, Kolasch & Birch, LLP

(57) ABSTRACT

The present invention relates to the method of increasing the working voltage of electrical double layer capacitor with enhanced working voltage, which has electrodes fabricated from porous carbon powder in which the pore sizes and the specific surface are created by extracting the non-carbon atoms from the carbon-rich organic or mineral compounds. The method is performed by step-by-step treatment of supercapacitor with the conditioning voltage ($U_c$), which is increased gradually up to the working voltage ($U_w$) by the voltage step ($DU_c$) which is less or equal to 0.2V.

10 Claims, 4 Drawing Sheets

(56) References Cited

FOREIGN PATENT DOCUMENTS

| | | |
|---|---|---|
| GB | 1465290 | 2/1977 |
| GB | 2179793 A | 3/1987 |
| JP | 2000-100668 A | 4/2000 |
| JP | 2004-128035 A | 4/2004 |

OTHER PUBLICATIONS

PCT/ISA/210—International Search Report mailed on May 25, 2012, issued in PCT/EP2011/069176.

PCT/ISA/237—Written Opinion of the International Searching Authority mailed on May 25, 2012, issued in PCT/EP2011/069176.

\* cited by examiner

ELECTRICAL DOUBLE LAYER CAPACITOR WITH ENHANCED WORKING VOLTAGE

TECHNICAL FIELD

This invention relates in general to the field of supercapacitors such as electrical double layer capacitors. More particularly, this invention relates to the method of increasing the working voltage of electrical double layer capacitor with enhanced working voltage, which has electrodes fabricated from porous carbon powder in which the pore sizes and the specific surface are created by extracting the non-carbon atoms from the carbon-rich organic or mineral compounds.

BACKGROUND ART

Commonly the working voltage (also as rated voltage) of activated carbon-based supercapacitors such as electrical double layer capacitors (EDLC) reaches 2.5-2.7V in organic electrolytes (reference is made to the products of e.g. Maxwell, Nesscap, Asachi Glass, Panasonic, Ioxus). Organic electrolytes are most often solutions of tetraalkyl ammonia salts in acetonitrile or organic carbonates. When carbon nanotubes are used as active electrode material, the applicable maximum voltage of 3.5V has been reported by Kenji Hata, Hiroaki Hatori and Osamu Tanaike in [PCT/JP2006/316137].

Prior art [Kobayashi Kotaro et al. EP1860673A1] also teaches that KOH-activated graphitic carbon electrodes, which possess relatively low specific surface area, can be used at the working voltage of 3.3V.

Activated carbons commonly used in supercapacitors are characterized as microporous or micro/mesoporous carbons, which are made by pyrolytical carbonization and consequent chemical activation of different carbon-rich organic precursors. Most common precursors are coconut shells, resins and waxes, sugar, residues of a paper industry, etc.

Micro and mesoporous carbon materials also may be derived from metal carbides. Such carbons are categorized as mineral amorphous carbons and are often called as carbide-derived carbons (CDC). These carbons are made by chlorinating the metal carbide powder at temperatures between 200 to 1000° C. Due to crystalline highly ordered carbon precursor, the CDC materials possess high apparent density and uniform pore structure. A narrow, well controlled pore size distribution of CDC material has a key role in a superior electrical double layer capacitance of CDC-based electrodes that exceeding of 90 Farads per $cm^3$ in organic electrolyte [Leis et al. Carbon 44 (2006) 2122-2129]. Despite of high capacitance, the working voltage Uw of CDC-based supercapacitors is never reported more than 3V, but usually 2.7-2.85V. The reasons of limited working voltage for the micro/mesoporous carbon based supercapacitors are decomposition of impurities in electrode material and absorption of electrolyte components in the carbon that promote an intensive heat and gas generation at voltages over 3V.

DISCLOSURE OF INVENTION

It is common practice that supercapacitor after assembling, sealing and saturating with the electrolyte must be conditioned to reach the rated energy and power characteristics. The routine method used for conditioning the capacitor is to repeat the charge-discharge cycling between working voltage (Uw) and half of the working voltage (Uw/2) until the stable electrochemical performance is achieved in terms of energy and power characteristics. In the case of porous activated carbon based supercapacitors the rated voltage is usually 2.5-2.85V, if organic electrolytes with tetraalkylammonium salt are used.

If a supercapacitor is charged-discharged in a voltage range that exceeds the working (rated) one, the electrochemical system quickly looses its performance. It is mainly caused by decomposing of electrolyte on the chemically active surface of carbon. Decomposition of the electrolyte and a poisoning of carbon surface with decomposition products is promoted by the elevate temperature and chemical impurities (e.g. such as water and oxygen containing functional groups) trapped in micropores or chemically bound to a surface of carbon.

We claim that a special conditioning method enables to increase the maximum working voltage (Uwmax) of micro/mesoporous (for example amorphous) carbon-based supercapacitors above 3V with maintaining the reasonable life time in terms of the number of charge-discharge cycles required in practical applications. The method of the present invention is applicable for all types of micro/mesoporous carbons, which may comprise of the activated carbon, originating of organic carbon-rich precursors. More specifically, the method of the present invention is applicable to the highly microporous carbons such as for example carbide-derived carbon (CDC). Here, the terms micropores and mesopores distinguish the pores, which sizes are less than 2 nm and 2-50 nm, respectively. In microporous carbon electrodes usually exists a large fraction of micropores, which can not be penetrated by electrolyte molecules (or ions) at working voltage Uw. At increased voltage (i.e. over the working voltage) the molecules (ions) in polarised dielectric field will be compressed and can be absorbed, which locally generates a lot of the heat of adsorption that also promotes a chemical decomposition of the electrolyte adsorbed in carbon electrodes.

The carbons used to make supercapacitor electrodes according to this invention are not limited to chemically pure carbon, but they may bear surface functional groups, be doped or other-wise chemically treated.

According to this invention the micro/mesoporous electrode pairs immersed to organic electrolyte, when conditioned by stepwise increasing of the conditioning voltage Uc during galvanostatic cycling to the maximum working voltage Uw, can behave as electrical double layer capacitors (EDLC) up to the working voltage of at least 4V.

BRIEF DESCRIPTION OF DRAWINGS

The method of the conditioning according to the present invention of the supercapacitors is now described in detail in the following embodiments and examples with references to the accompanied drawings where In the FIG. 1 is shown an inventive example 4 describing galvanostatic cycling of "1000F" CDC based prismatic supercapacitor stepwise conditioned to the working voltage Uw of 4.0V, the results shown in figure confirm the stable performance in terms of a temperature change, expansion/contraction and a linear voltage profile of the supercapacitor during cycling between 4.0V and 2.0V.

In the FIG. 2 is shown a comparative example 1 describing galvanostatic cycling of "1000F" CDC based prismatic supercapacitor without preliminary conditioning according to the method of the present invention to the working voltage (Uw) of 4.0V, the results of the first cycle shown in figure shows that working voltage 4V was not possible to reach. The temperature increase and expansion of the supercapacitor during first charge cycle went over the reasonable values. Further running of the experiment was not safe and was stopped at the ~3.5V.

Figure 3:
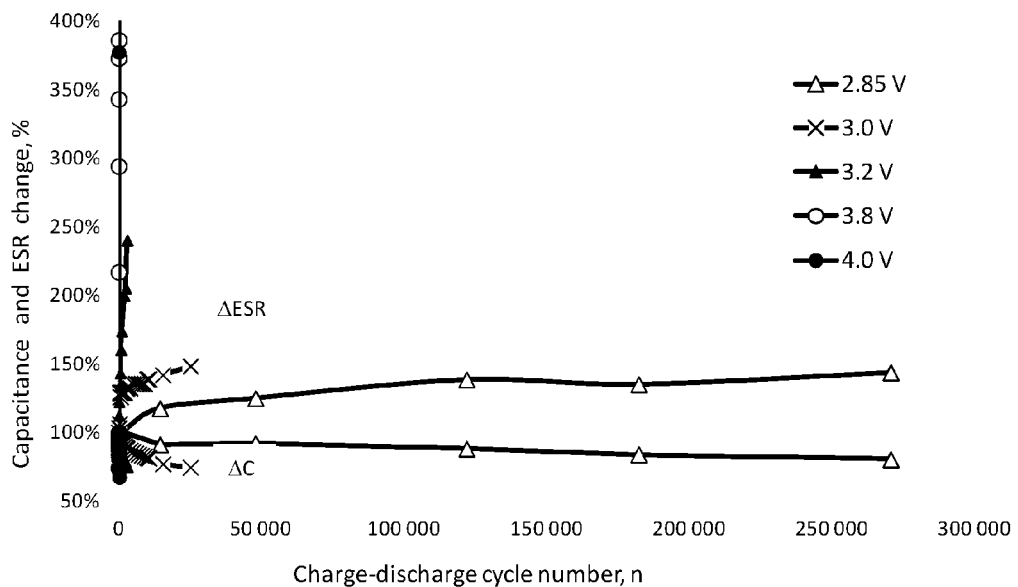

In the FIG. 3 is shown a cycle life of unconditioned supercapacitors at different working voltages (Uw is noted in figure). Cycling was performed between working voltage Uw and Uw/2.

Figure 4:
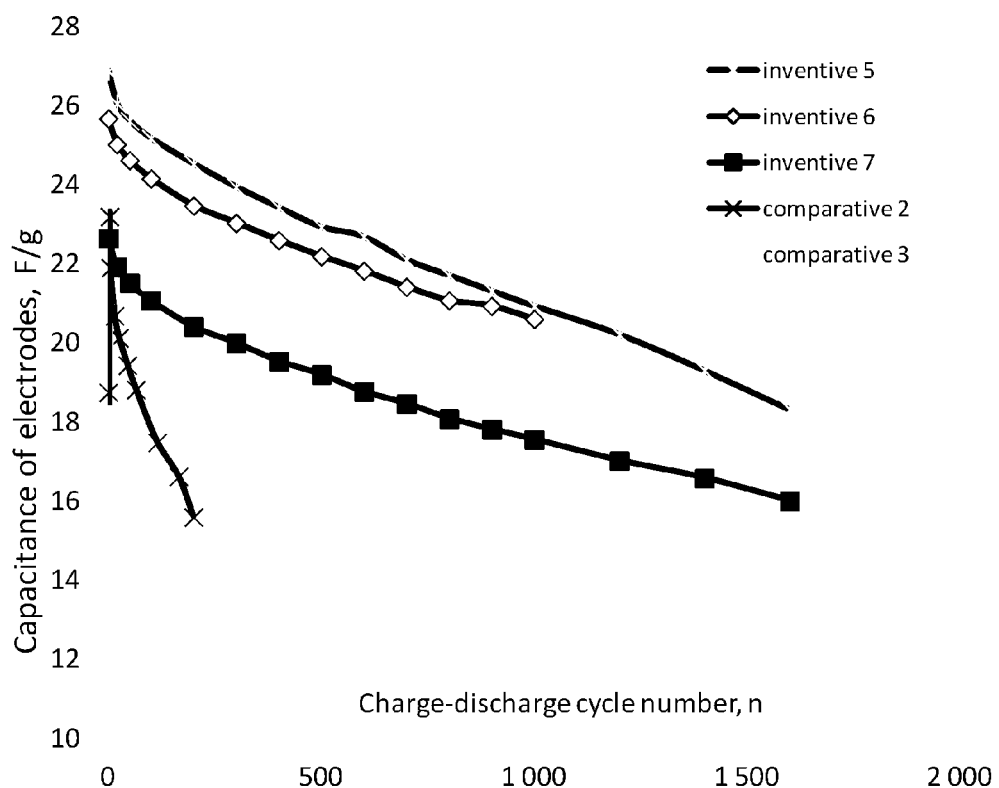

In the FIG. 4 is shown cycle-life according to the capacitance of inventive and comparative supercapacitors, which were cycled between 4.0V and 2.0V. Commonly a lifetime of supercapacitor is counted to the capacitance value of 70% of the initial capacitance.

Figure 5:
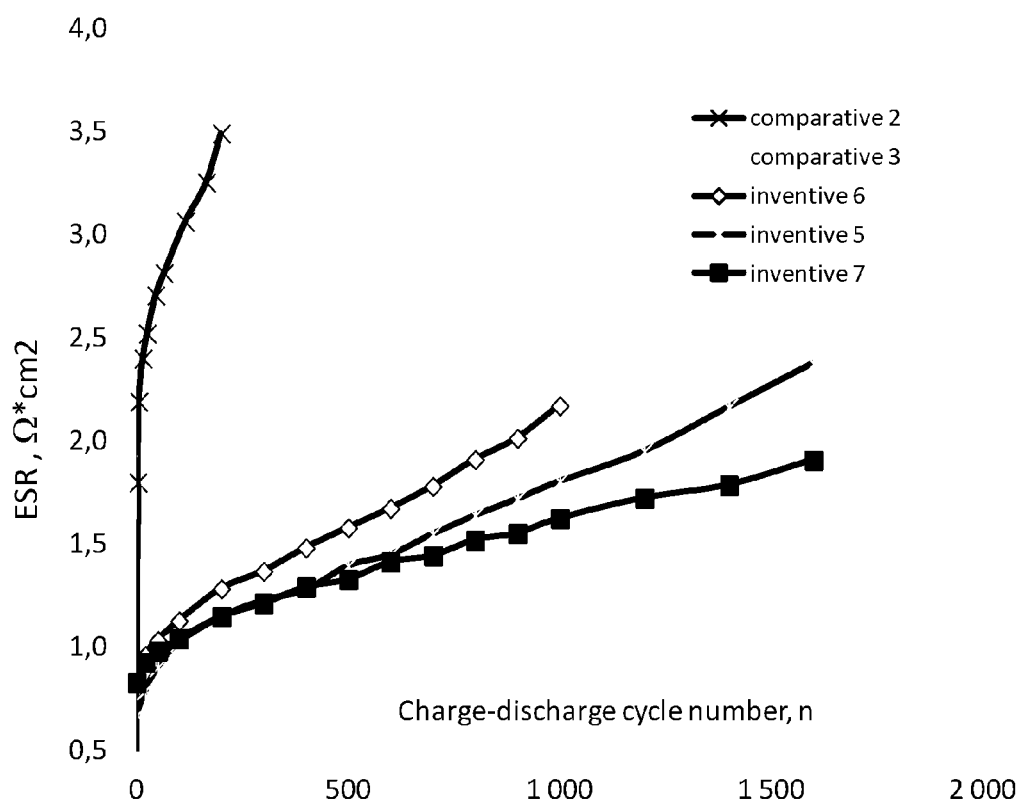

In the FIG. 5 is shown cycle-life according to the resistance of inventive and comparative supercapacitors, which were cycled between 4.0V and 2.0V. Commonly a lifetime of supercapacitor is counted to the ESR value of 200% of the initial resistance.

BEST MODE FOR CARRYING OUT THE INVENTION

Following examples specify the inventive matter and show the application limits.

Method of Making the Supercapacitor

Polarisable carbon electrodes were prepared as follows.

The mixture of 92% (wt.) carbon and 8% (wt.) polytetrafluoroethylene (PTFE, Aldrich, 60% suspension in water) was rolled stepwise into the carbon film with a final thickness of 80-100 μm. After drying, the raw electrode sheets were coated from one side with a thin aluminium layer (2 ±1 μm) using the physical vapour deposition method. The electrodes were attached to current collector: Aluminium (Al) foil, and interleaved with an ion-permeable separator paper from Nippon Kodoshi®. The electrode pairs from positively and negatively charged electrodes were connected in parallel. The electrode pack prepared was placed in a sealed aluminium container and stored under vacuum to degas the electrode stack and then impregnated with the electrolyte. In following examples, the electrolyte was 1.8M triethylmethylammonium tetrafluoroborate (TEMA) in anhydrous acetonitrile (AN, Riedel-de Haën, H2O<0.003%). [0001] However, it is well understood to the experts skilled in the field that the invention is not limited to this particular electrolyte and it can be whatever organic electrolyte including organic solvents: nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone, polar aprotic organic solvent such as a cyclic ester, chain carbonate, cyclic carbonate, chain ether and/or cyclic ether solvent or a mixture of such solvents and a salt. The electrolyte salt can be selected from the group of tetrafluoroborates, or hexafluorophosphates or trifluoromethanesulfonate of tetraalkylammonium, tetrakis(dialkylamino) phosphonium, N,N-dialkyl-1,4-diazabicyclo[2.2.2]octanediium or their mixture. The electrolyte can be also at least one ionic liquids such selected from the group consisting of: butyltrimethylammonium bis(trifluoromethylsulfonyl)imide, 1-ethyl-3-methylimidazolium bis(trifluoromethylsulfonyl)imide, 1-methyl-3-propylimidazolium bis(trifluoromethylsulfonyl)imide, 1-hexyl-3-methylimidazolium bis(trifluoromethylsulfonyl)imide, 1-methyl-3-propylimidazolium iodide, 1-ethyl-3-methylimidazolium thiocyanate, 1-methyl-1-propylpiperidinium bis(trifluoromethylsulfonyl)imide, 1-butyl-2-methylpyridinium bis(trifluoromethylsulfonyl)imide, 1-butyl-4-methylpyridinium bis(trifluoromethylsulfonyl)imide, 1-butyl-1-methylpyrrolidinium bis(trifluoromethylsulfonyl)imide, diethylmethylsulfonium bis(trifluoromethylsulfonyl)imide, lithium bis(trifluoromethylsulfonyl)imide, and mixtures thereof.

After filling with the electrolyte, the supercapacitor cell is stored for penetration of micropores by electrolyte. The storing time depends from the storing temperature, for example in the storing temperature 60° C. the storing time is at least 48 h which guarantees that the micropores are fully penetrated by the electrolyte. For the person skilled in the art is clear that storing supercapacitor in room temperature or in condition of the vacuum or high pressure the storing time of the supercapacitor can be increased or decreased to have the micropores fully penetrated by the electrolyte. In addition said storing time can depend on the type of the electrolyte used.

Method of Electrochemical Testing and Evaluation of Supercapacitors.

The capacitance (C) and equivalent series resistance (ESR) values during the cycling were recorded by Impedance spectrometer at fixed voltage value using the frequency sweep within 100 kHz to 10 mHz.

The capacitance was calculated at the frequency of 10 mHz and the ESR at 100 Hz. The cycling process between conditioning voltage Uc and Uc−ΔU was performed with potential sweep rate of 10 mV/s, where Uc is a voltage in the conditioning step (for example $Uc_1$ is a conditioning voltage in the step 1 up to $Uc_{n-1}$ which is a conditioning voltage of the last but one step and $Uc_n$ is a conditioning voltage of the last step where $Uc_n$ is equal to the working voltage Uw; ΔU is a difference between maximum and minimum voltage during cycling (i.e. ΔU is from 0 to Uc whereas ΔU=0 means that there is no cycling and the voltage of the conditioning step is hold and increased step-by-step to the working voltage Uw. If the 0<ΔU ≤mUc in the conditioning step the cycling is performed where the supercondensator is charged to voltage Uc and thereafter discharged to the voltage Uc−ΔU). ΔUc is a voltage step in the conditioning process. The ESR values during step-by-step conditioning process for Uc, comprised of $Uc_1 \ldots Uc_{n-1}$ up to $Uc_n$=Uw were recorded by Impedance Spectrometer (Solartron) by using the DC potential sweep rate of 10 mV/s and AC signal of 10 mV at 1 kHz.

Following inventive examples explain the method of step-by-step conditioning of supercapacitors for increased working voltage.

Table 1. Carbon materials used for making the supercapacitors.

TABLE 1

| Carbon | Company | BET surface area, m²/g | Total pore volume, cm³/g | Micropore volume, cm³/g |
|---|---|---|---|---|
| Carbide-derived TiC950/800 | Skeleton Technologies | 1400 | 0.70 | 0.57 |
| Coconut-derived YP-50F | Kuraray Chemical Co | 1430 | 0.71 | 0.58 |
| Phenolic resin-derived RP-20 | Kuraray Chemical Co | 1570 | 0.73 | 0.65 |
| Carbide-derived TiC950/800LPT | Skeleton Technologies | 1500 | 0.70 | 0.60 |
| Carbide-derived TiC1000PT | Skeleton Technologies | 2030 | 1.13 | 0.72 |

Inventive example 1 describes a step-by-step conditioning of carbide-derived carbon electrodes for working voltage of 4.0V.

A supercapacitor composed from the carbide-derived carbon TiC950/800 (see in Table 1) electrodes was electrochemically stabilised by cycling with constant current (50 mA/F) between 2.85V and 1.425V. Galvanostatic cycling was continued until the capacitance (C), ESR(R) and the round trip efficiency (RTE) reached the stable values. (Usually it takes 50 to 100 cycles). After that the supercapacitor was charged-discharged with constant potential sweep rate of 10 mV/s by increasing the maximum voltage step-by-step to the value of 4.0V. The voltage step (ΔUc) was as maximum 0.2V as described in Table 2. The lower limit in voltage during cycling was fixed at 1.5V. Five cycles were done at each conditioning voltage step (Uc). The step-by-step conditioning for working voltage of 4.0V may also be done by using the constant DC current, constant power (CP), gradually increased constant voltage, pulse-current, pulse-power and pulse-voltage and other charge-discharge cycling methods of supercapacitor with or without AC signal.

Inventive example 2 describes step-by-step conditioning as in Inventive example 1 with a difference that the coconut shell derived activated carbon (CSDAC) electrodes were used in supercapacitor.

Table 2. Change of the ESR during conditioning process from 3V to 4V of CDC based supercapacitor. Charge-discharge cycling was done from Uc to 1.5V at each conditioning voltage ($Uc_1 \ldots Uc_{10}$).

TABLE 2

Table 2

| Voltage (Uc), V | Relative ESR [%] at maximum voltage value | | | | |
|---|---|---|---|---|---|
| | 1st cycle | 2nd cycle | 3rd cycle | 4th cycle | 5th cycle |
| 3.0 | 100% | 100.9 | 101.0 | 101.9 | 102.0 |
| 3.2 | 100% | 101.3 | 101.8 | 101.7 | 102.2 |
| 3.3 | 100% | 101.0 | 101.7 | 102.5 | 103.1 |
| 3.4 | 100% | 102.5 | 103.4 | 105.0 | 105.7 |
| 3.5 | 100% | 102.5 | 104.6 | 106.2 | 106.9 |
| 3.6 | 100% | 104.2 | 105.8 | 107.0 | 107.6 |
| 3.7 | 100% | 103.3 | 104.2 | 105.5 | 105.8 |
| 3.8 | 100% | 103.6 | 104.9 | 105.4 | 105.7 |
| 3.9 | 100% | 103.9 | 104.0 | 104.7 | 105.1 |
| 4.0 | 100% | 101.8 | 101.9 | 102.0 | 102.4 |

Inventive example 3 describes step-by-step conditioning as in Inventive example 1 with a difference that the phenolic resin derived activated carbon (PRDAC) electrodes were used in supercapacitor.

Table 3. Decay of supercapacitor performance during charge-discharge cycling between 4.0V to 1.5V in terms of the relative increase of ESR measured at 4.0V.

TABLE 3

Table 3

| Example # | Electrode material | 1st cycle | 2nd cycle | 3rd cycle | 4th cycle | 5th cycle |
|---|---|---|---|---|---|---|
| Inventive example No. 1 | CDC | 0% | 1.8% | 1.9% | 2.0% | 2.4% |
| Inventive example No. 2 | CSDAC | 0% | 1.8% | 3.3% | 3.9% | 5.1% |
| Inventive example No. 3 | PRDAC | 0% | 3.5% | 4.5% | 5.7% | 7.4% |

Different decays during first cycles at Uw=4.0V observed in Inventive examples 1-3 presented in Table 3, are explained by different chemical purity of carbon materials. CDC of Inventive example 1 represents the best performance mainly because it is produced from the precursor (TiC), which does not contain oxygen. Therefore, this carbon is free of oxygen containing functional groups, which otherwise would increase the decay of respective supercapacitor. Secondly, the CDC TiC950/800 is post-treated in hydrogen at high temperature that chemically purifies the surface of carbon.

Inventive example 4 describes galvanostatic cycling of "1000F" CDC based prismatic supercapacitor stepwise conditioned to the working voltage of 4.0V.

Figure 1:
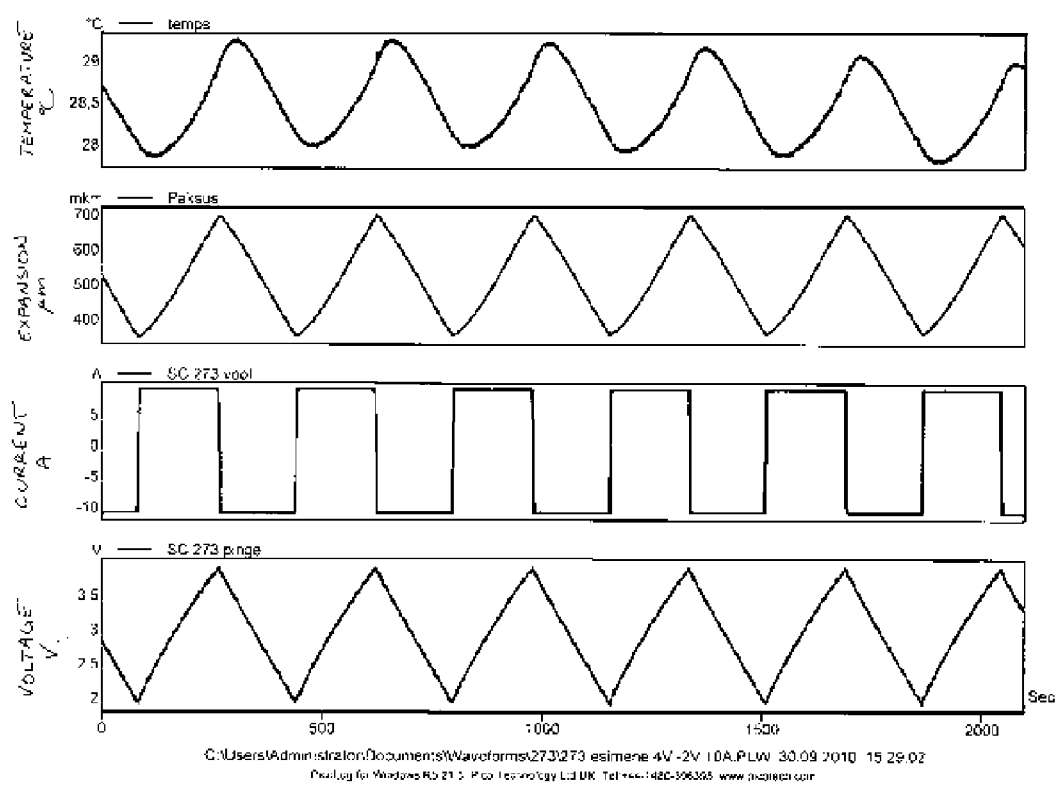

The results shown in FIG. 1 confirm the stable performance in terms of a temperature change, expansion/contraction and a linear voltage profile of the supercapacitor during cycling between 4.0V and 2.0V.

Figure 2:
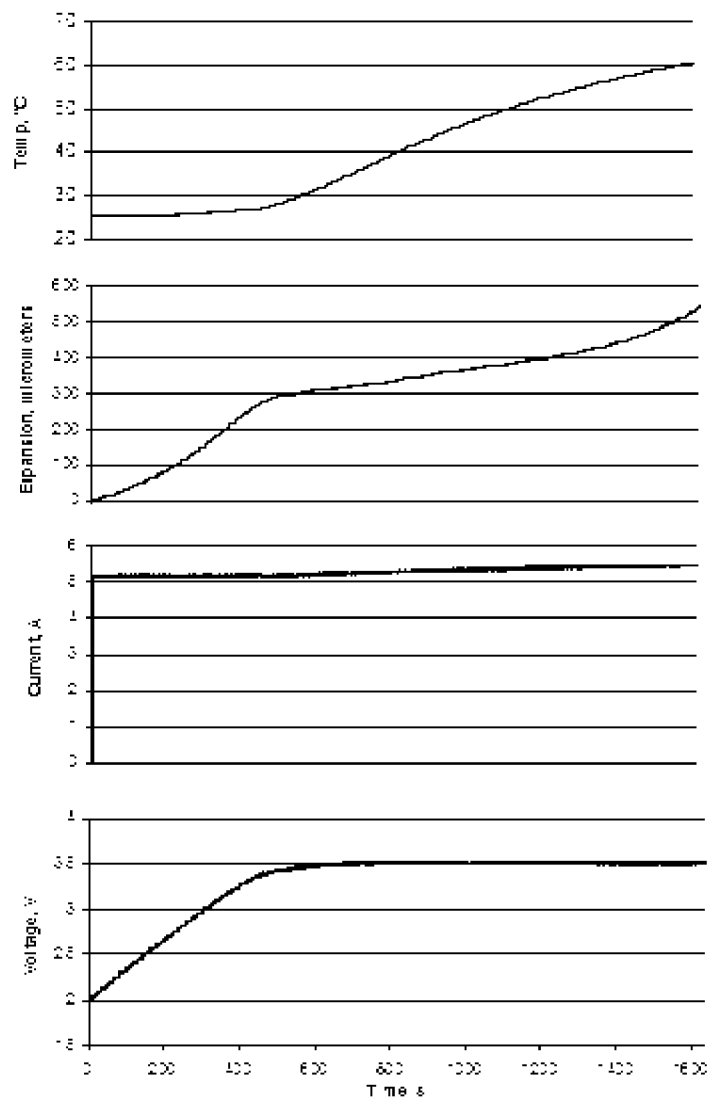

Comparative example 1, shown in FIG. 2, represents the opposite case where a galvanostatic cycling of "1000F" CDC based prismatic supercapacitor not conditioned by the method of this invention, is unsuccessfully attempted according to the method of the present invention to charge to working voltage Uw 4.0V. This figure shows that working voltage Uw 4V was not possible to reach because of the temperature increase and expansion of the supercapacitor during first charge cycle went over the reasonable values. Further running of the experiment was not safe and was stopped at the ~3.5V.

Next examples serve as comparative examples for demonstrating the state of the art supercapacitors and also for showing the purview of present invention. FIG. 3 describes the performance of supercapacitors, which were made of carbide-derived carbon TiC950/800LPT (see Table 1) according to the method of making supercapacitors, but were charged-discharged between Uw and Uw/2 without preliminary step-by-step conditioning up to working voltage Uw. Uw in these examples was varied from 2.85V to 4.0V. In FIG. 3, it is clearly seen that the decay of cycle life increases with increasing the Uw. It can also be seen that performance of supercapacitors regarding charge-discharge cycling drastically worsens when Uw is increased from 2.85V to 3V. Therefore, the step-by-step conditioning of supercapacitors by the method of this invention gives advantage for applying to the supercapacitor the working voltage of 3.0V and up.

An important role of step-by-step training is comparatively presented in FIGS. 4 and 5, where a cycle life of step-by-step conditioned supercapacitors of Inventive Examples 5-7 is compared to unconditioned supercapacitors of Comparative Examples 2-3. Numerical characteristics of these supercapacitors are collected in Table 4, which clearly show the advantage of this invention over the state-of-the-art supercapacitors cycled between 4V and 2V.

Table 4. Rated capacitance ($C_R$), life span at 70% of the initial and the rate of decay of supercapacitors during charge-discharge cycling between 4V to 2V.

TABLE 4

Table 4

| Example # | Carbon | $C_R$, (F/g) @BOL* | Capacitance decrease by 100 cycles | No. of cycles @EOL* (70% of $C_0$) |
|---|---|---|---|---|
| Inventive example No. 5 | Carbide derived TiC1000PT | 26.9 | 6% | 1500 |
| Inventive example No. 6 | Carbide derived TiC950/800LPT | 25.7 | 6% | 1500 |
| Inventive example No. 7 | Coconut derived YP-50F | 22.7 | 7% | 1600 |
| Comparative example No. 2 | Carbide derived TiC950/800LPT | 23.2 | 25% | 165 |
| Comparative example No. 3 | Coconut derived YP-50F | 20.9 | 29% | 100 |

*BOL is beginning of the life; EOL is the end of the life

The invention claimed is:

1. A method of conditioning a supercapacitor to its working voltage, wherein the supercapacitor comprising at least one pair of positively and negatively charged electrodes, including at least one polarisable micro/mesoporous carbon electrode, interleaved with porous ion-conductive separator and immersed in an electrolyte, wherein a destructive effect of heat of adsorption is suppressed by a multistep conditioning process, wherein before the conditioning of the supercapacitor, a supercapacitor cell is stored after filling with the electrolyte for penetration of micropores by electrolyte followed by step-by-step treatment of the supercapacitor with a conditioning voltage (Uc), which is increased gradually up to the working voltage (Uw) by voltage step (ΔUc) which is less than 0.3V, wherein during the conditioning step is performed the voltage cycling wherein the supercapacitor is charged to the conditioning voltage (Uc) and thereafter discharged to the voltage Uc-ΔU wherein the ΔU is between 0 and Uc.

2. The method according to the claim 1 wherein a number of the conditioning steps is predetermined by voltage step (ΔUc) so that the supercapacitor working voltage is reached.

3. The method according to claim 1 wherein the supercapacitor before treatment by conditioning voltage (Uc) is electrochemically stabilised by galvanostatic cycling at Uc of less than 3.0V until stable performance according to ESR and capacitance is obtained.

4. The method according to claim 1 wherein a micro/mesoporous carbon of the micro/mesoporous carbon electrode is carbide-derived carbon.

5. The method according to claim 1 wherein a micro/mesoporous carbon of the micro/mesoporous carbon electrode is coconut shell derived activated carbon.

6. The method according to claim 1 wherein a micro/mesoporous carbon of the micro/mesoporous carbon electrode is phenolic resin derived activated carbon.

7. The method according to the claim 1 wherein the electrolyte used for immersion of the micro/mesoporous carbon electrode is an electrolyte salt and a solvent selected from the group consisting of acetonitrile, acrylonitrile, propionitrile, dimethyl sulfoxide, diethyl sulfoxide, ethyl methyl sulfoxide, benzylmethyl sulfoxide, dimethyl formamide, N-methylpyrrolidone, cyclic ester, chain carbonate, cyclic carbonate, chain ether, cyclic ether solvent, and mixtures thereof.

8. The method according to the claim 1 wherein before conditioning the supercapacitor, the supecapacitor cell is stored after filling with the electrolyte at the temperature which is higher than a room temperature for penetration of micropores by electrolyte.

9. The method according to the claim 7, wherein the electrolyte salt is selected from the group consisting of tetrafluoroborates of tetraalkylammonium, hexafluorophosphates of tetraalkylammonium, trifluoromethanesulfonate of tetraalkylammonium, tetrakis(dialkylamino) phosphonium, N,N-dialkyl-1,4-diazabicyclo[2.2.2]octanediium, and mixtures thereof.

10. The method according to the claim 1, wherein the electrolyte used for immersion of the micro/mesoporous carbon electrode comprises at least one ionic liquid selected from the group consisting of butyltrimethylammonium bis(trifluoromethylsulfonyl)imide, 1-ethyl-3-methylimidazolium bis(trifluoromethylsulfonyl)imide, 1-methyl-3-propylimidazolium bis(trifluoromethylsulfonyl)imide, 1-hexyl-3-methylimidazolium bis(trifluoromethylsulfonyl)imide, 1-methyl-3-propylimidazolium iodide, 1-ethyl-3-methylimidazolium thiocyanate, 1-methyl-1-propylpiperidinium bis(trifluoromethylsulfonyl)imide, 1-butyl-2-methylpyridinium bis(trifluoromethylsulfonyl)imide, 1-butyl-4-methylpyridinium bi s(trifluoromethylsulfonyl)imide, 1-butyl-1-methylpyrrolidinium bis(trifluoromethylsulfonyl)imide, diethylmethylsulfonium bis(trifluoromethylsulfonyl)imide, lithium bis(trifluoromethylsulfonyl)imide.

* * * * *